Sept. 30, 1958 W. SCHRAUB 2,853,901
HORIZONTAL BORING MACHINE WITH GUIDE
Filed July 12, 1955 2 Sheets-Sheet 1

Inventor:
Willi Schraub,
By Freeman & Marmor,
His Agents.

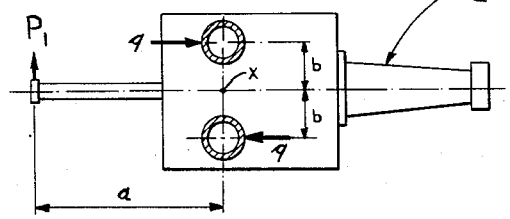
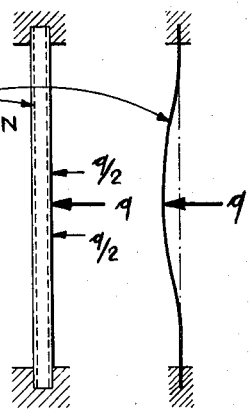
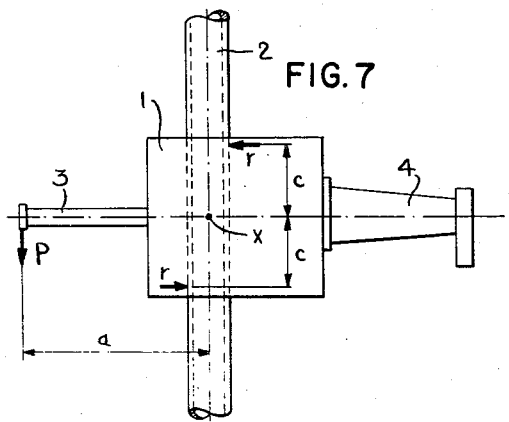
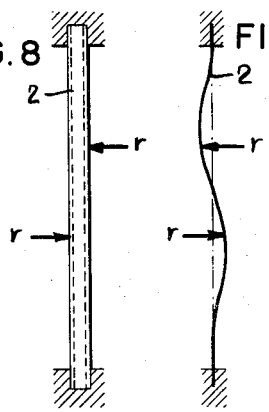
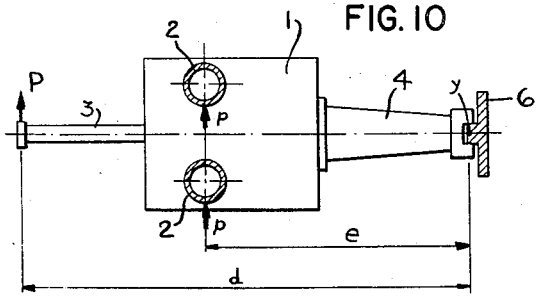
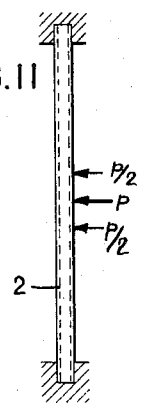
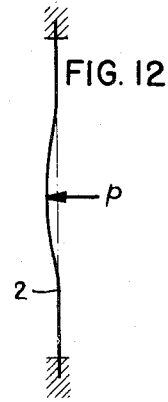

United States Patent Office 2,853,901
Patented Sept. 30, 1958

2,853,901

HORIZONTAL BORING MACHINE WITH GUIDE

Willi Schraub, Beckrath, near Wickrath (Niers), Germany, assignor to Scharmann & Co. G. m. b. H., Rheydt, Germany, a limited liability company of Germany Application July 12, 1955, Serial No. 521,434

Claims priority, application Germany July 19, 1954

4 Claims. (Cl. 77—3)

The invention relates to horizontal boring machines, and relates more particularly to a horizontal boring machine of the type which has two vertical columns for vertically guiding a spindle head.

Reference is being had to my Patent No. 2,699,694, patented January 18, 1955, and to my copending application Serial No. 410,477, filed February 16, 1954, now Patent No. 2,774,260, issued on December 18, 1956.

The instant invention has among its objects to provide for an additional guiding of the spindle head, thereby reducing the forces applying on the guiding columns during machining.

With the above and other objects of the invention in view, the invention consists in the novel construction, arrangement and combination of various devices, elements and parts, as set forth in the claims hereof, one embodiment of the same being illustrated in the accompanying drawings and described in the specification.

In the accompanying drawing,

Figure 4 is a schematic plan view, partly in section, of a boring machine without additional guiding of the spindle head, with horizontal forces shown applied thereto;

Figures 5 and 6 are schematic elevational views, partly in section, of the columns, and their deformation shown in exaggerated form;

Figure 7 is a fragmentary elevational view of the spindle head of Figure 2 with vertical forces shown applied;

Figures 8 and 9 are schematic elevational views, partly in section, similar to Figures 5 and 6 but relating to forces of Figure 7;

Figure 10 is a schematic plan view, partly in section, similar to Figure 2 showing horizontal forces applied; and Figures 11 and 12 are schematic elevational views, partly in section, similar to Figures 4 and 6, but relating to forces of Figure 10.

Figure 1:
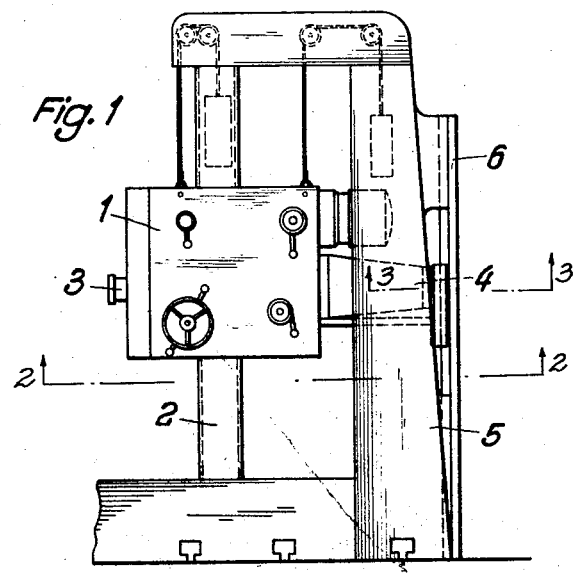
Figure 1 is a fragmentary side elevational view of a horizontal boring machine in accordance with the invention.

In the exemplification illustrated in the views, there is provided a spindle head 1 that is vertically reciprocable on two cylindrical hollow vertical guiding columns 2. The guiding columns 2 are supported on a conventional bed. The spindle head 1 has counter balancing weights to facilitate vertical shifting of the spindle head.

The spindle head 1 carries a boring spindle 3, and carries oppositely thereto a control arm or console 4 in which there are journalled (though not shown in detail as in my aforementioned patent) the boring spindle parts as well as the clamping mechanism therefor.

Supporting means 5 are provided, that may be composed of two upright hollow brackets which are interconnected at their tops with the top of the columns 2 by a cross-bridge to stabilize the columns 2.

Figure 2:
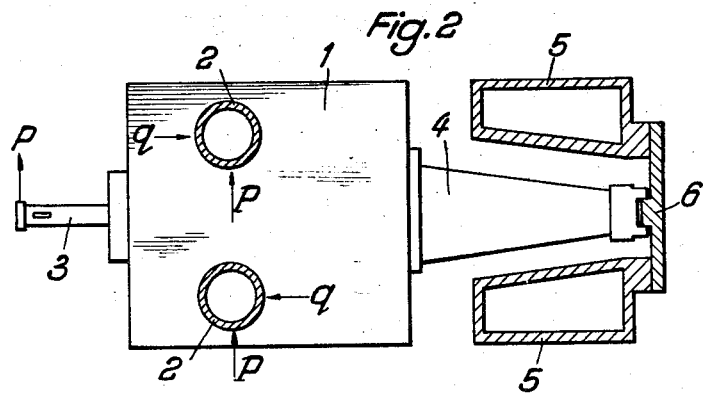
Figure 2 is a sectional view taken on line 2—2 of Figure 1.

To the upright support 5 there is connected an upright beam or bar 6 that may have a T-shaped cross-section the web of which guides, as best shown in Figure 2, a corresponding recess that is formed in the terminal portion of the console 4.

Figure 3:
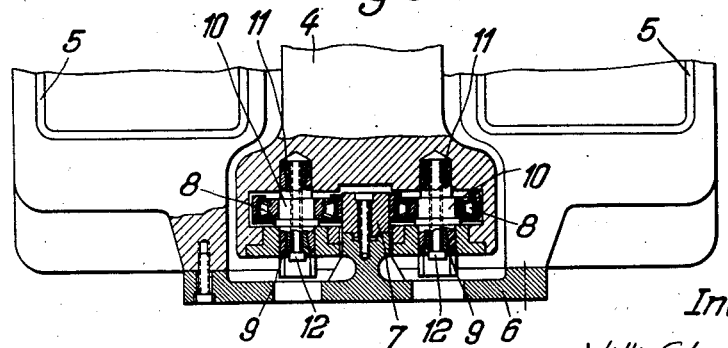
Figure 3 is a large scale fragmentary elevational view, partly in section taken on line 3—3 of Figure 1.

A specific exemplification of the foregoing construction principle is shown in Figure 3. The bar 6 is screwed onto the upright support 5, and a rail 7 is screwed to the web of the bar 6. Two self aligning bearings 8 are inserted into terminal portions of the console 4. Each of these bearings is journalled on a tube 9 and has an eccentric bearing seat 10. By turning the tubes 9, the distance between the centers of the bearings 8 may finely be adjusted.

A locking mechanism is provided for each bearing 8 to lock it in the adjusted position. Two opposite tapered sleeves are disposed in each tube 9, and cooperate with corresponding opposite tapered portions of the tube 9, and can be moved in the tube 9 axially thereof by means of a screw 12. By turning the screw 12 of one of the bearings 8, in the direction of tensioning, both tapered sleeves of that bearing will frictionally engage the corresponding portions of the tube 9 elastically widening the tube to wedge it against the body of the console 4 to lock that bearing 8 in the position following the aforementioned fine adjustment thereof.

The advantages of the instant construction will be explained in connection with an example illustrated in Figures 2 and 4–12.

During the boring operation, the reaction force generated by the cutting pressure will tend to turn the head 1 together with the console 4, in the direction of an arrow P applied to the bore spindle 3. This results in the occurrence of forces in the direction of the arrows $p$ applied against the columns 2, tending to bend the columns 2. The magnitude of the forces $p$ can easily be calculated according to Archimedes' law of levers. Owing to the large distance of the location of the guide 6 for the console from the operating end of the bore spindle 3, and from the columns 2, it is evident that each column 2 will be subjected to a force $p$ which is only slightly larger than one-half of the cutting pressure, as explained below.

In Figures 4, 5 and 6 there is shown a spindle head and columns of a prior construction which does not have the additional guiding means of the instant invention, for instance the construction in accordance with my aforementioned copending application Ser. No. 410,477, now Patent No. 2,774,260. In Figure 4 there are illustrated the horizontal forces that apply when the boring tool makes a horizontal cut. The cutting force $P_1$ causes an angular reaction moment $P_1 \times a$ about the point $x$ as a fulcrum. From this there result two angular moments $q \times b$ about the point $x$. The spindle head of the machine thus presses against each of the vertical columns with a force $q$. Since the spindle head has a certain height, and its bearings are disposed close to the upper and lower terminal surface of the spindle head, it follows that each force $q$ will apply only with one-half of its value on each bearing of each column, as illustrated in Figure 5. As best shown in Figure 6, this causes a bending of the tubular columns and therefore a displacement of the entire spindle head, resulting in a definite calculatable and comparable large inaccuracy of boring.

The effect of the vertical force arising from the reaction to vertical cutting by the tool on the boring spindle 3 are indicated in Figures 7, 8 and 9. The cutting force P results in an angular reaction moment $r \times c$ about the point $x$ as a fulcrum. The forces $r$ are smaller than the forces $q$ because the distances $c$, owing to the aforementioned placement of the bearings close to the top and bottom surfaces of the spindle head 1, are larger than the distances $b$. Furthermore, the forces $r$ are applied to both columns 2 so that to each column 2 there is applied only one-half of the force that results from the moment. The forces r effect a corrugation type of bending onto the column 2 (Figure 9) but the extent of bending from the vertical forces is considerably smaller than the previously mentioned bending from the horizontal forces upon the prior construction (Figure 6).

The bending owing to the vertical forces is hardly noticeable even where large vertical cutting forces are involved. Accordingly, machines of the prior construction are subjected to inaccuracies in boring mainly brought about by the horizontal cutting force and the resulting torque moment. The instant invention aims to reduce the inaccuracy, rendering it possible to make more accurate round borings.

In accordance with the invention there is provided, as previously stated, an additional guiding means for stabilizing. The resulting improvement in reaction to horizontal cutting forces is illustrated in Figures 10–12. The fulcrum for the angular moment generated by the horizontal cutting forces P is moved to the point $y$ adjacent the guiding bar 6. The angular reaction moment resulting from the horizontal cutting force P is $P \times d$ about the point $y$. From this there results an angular moment $2p \times e$, so that on each column 2 there will be exerted a horizontal force $p$. From the ratios of the lengths $a$ and $b$ and respectively $d$ and $e$, it is evident that the force $p$ is considerably smaller than the force $q$; consequently, each column 2 under the instant construction will be subject to a far smaller horizontal bending force than under the prior construction. Furthermore, the inaccuracy during the boring is still reduced by the effect that the fulcrum $y$ is further away from the tube than the previously effective fulcrum $x$.

The instant invention thus accomplishes that the inaccuracies caused by horizontal forces is reduced to a manageable small size, and is almost eliminated. The horizontal forces are therefore no more detrimental than the vertical forces, so that with a machine of the instant type there may be carried out completely accurate round borings.

The foregoing explanation demonstrates that the deviations of the bore spindle 3 as engendered by the cutting pressure from the intended position is materially reduced by the guiding as compared to where such guiding would be absent. The instant invention therefore promotes greater precision in the operation of the horizontal boring machine.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a horizontal boring machine having a vertically movable spindle head including a boring tool and two upright columns spaced from each other and in sliding engagement with the spindle head, and upright support means for stabilizing the columns, in combination with, a console projecting from the spindle head oppositely of the tool thereof, whereby the columns will be disposed between the tool and the console, and upright guiding means secured to said upright support means and guiding the free end of said console restraining sideward movement of said free end in any position of the spindle head, said guiding means comprising a T-beam, said console having a recess in sliding engagement with the web of said beam.

2. In a horizontal boring machine having a vertically movable spindle head including a boring tool and two upright columns spaced from each other and in sliding engagement with the spindle head, and upright support means for stabilizing the columns, in combination with, a console projecting from the spindle head oppositely of the tool thereof, whereby the columns will be disposed between the tool and the console, and upright guiding means secured to said upright support means and guiding the free end of said console restraining sideward movement of said free end in any position of the spindle head, said guiding means comprising a rail, two bearings connected to said console and spaced apart from each other and engaging opposite side surfaces of said rail, and means operable for adjusting the distance between said bearings.

3. In a horizontal boring machine as claimed in claim 2, together with, means operable for locking each bearing in the adjusted position.

4. In a horizontal boring machine, as claimed in claim 2, said bearings including self-aligning bearing elements.

References Cited in the file of this patent

UNITED STATES PATENTS

| | | |
|---|---|---|
| 639,262 | Mills et al. | Dec. 19, 1899 |
| 838,999 | Hylander | Dec. 18, 1906 |
| 968,718 | Wahlstrom | Aug. 30, 1910 |
| 2,497,735 | McCullough | Feb. 14, 1950 |

FOREIGN PATENTS

| | | |
|---|---|---|
| 460,639 | Great Britain | Apr. 23, 1935 |